(12) United States Patent
Tsuboi (10) Patent No.: US 11,838,108 B2
(45) Date of Patent: Dec. 5, 2023

(54) COMMUNICATION APPARATUS, METHOD, AND STORAGE MEDIUM INCLUDING AN ELECTRONIC VIEWFINDER AND A LINE OF SIGHT INPUT FUNCTION THAT PREVENTS A DECREASE IN OPERABILITY OF THE IMAGING APPARATUS

(71) Applicant: CANON KABUSHIKI KAISHA, Tokyo (JP)

(72) Inventor: Satoru Tsuboi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/849,071

(22) Filed: Jun. 24, 2022

(65) Prior Publication Data

US 2022/0416927 A1  Dec. 29, 2022

(30) Foreign Application Priority Data

Jun. 25, 2021 (JP) ................. 2021-105593

(51) Int. Cl.
*H04J 3/06* (2006.01)
*H04L 7/00* (2006.01)

(52) U.S. Cl.
CPC .......... *H04J 3/0667* (2013.01); *H04L 7/0012* (2013.01); *H04L 7/0037* (2013.01)

(58) Field of Classification Search
CPC ..... H04J 3/0667; H04L 7/0012; H04L 7/0037
See application file for complete search history.

(56) References Cited

U.S. PATENT DOCUMENTS

| 9,711,119 B2 * | 7/2017 | Sato ..................... G10H 1/42 |
| 10,284,692 B2 * | 5/2019 | Ichimura ............... H04L 7/0008 |
| 11,588,609 B2 * | 2/2023 | Mula .................... H04L 7/0012 |

FOREIGN PATENT DOCUMENTS

JP  2017050730 A  3/2017

* cited by examiner

*Primary Examiner* — Chandrahas B Patel
(74) *Attorney, Agent, or Firm* — Canon U.S.A., Inc. IP Division

(57) ABSTRACT

A communication apparatus includes a plurality of clocks configured to output signals indicating current times, a plurality of counter units configured to synchronize with the plurality of clocks using the signals indicating the current times output from the plurality of clocks, an instruction unit configured to give an instruction to acquire count values of the plurality of counter units, an acquisition unit configured to acquire the count values of the plurality of counter units based on the instruction from the instruction unit, and a calculation unit configured to calculate a difference between the acquired count values.

13 Claims, 8 Drawing Sheets

COMMUNICATION APPARATUS, METHOD, AND STORAGE MEDIUM INCLUDING AN ELECTRONIC VIEWFINDER AND A LINE OF SIGHT INPUT FUNCTION THAT PREVENTS A DECREASE IN OPERABILITY OF THE IMAGING APPARATUS

BACKGROUND OF THE DISCLOSURE

Field of the Disclosure

The present disclosure relates to communication apparatuses, methods, and storage media.

Description of the Related Art

One of the time synchronization methods using networks is the Precision Time Protocol (PTP), an Institute of Electrical and Electronics Engineers (IEEE) 1588 standard. The PTP functionality allows a PTP master apparatus with accurate time functionality that serves as a time synchronization master to transmit PTP packets including time to a PTP slave apparatus that serves as a time synchronization apparatus (a slave) and the PTP slave apparatus to receive the PTP packets, achieving time synchronization. A PTP master apparatus, a PTP slave apparatus, and an apparatus that relays PTP packets each include a PTP hardware clock (hereinafter referred to as "PHC") for counting a time in a communication interface to write accurate times to PTP packets or obtain accurate times. A PHC is typically added to each communication port of a communication interface that synchronizes the PHC with the time of the time synchronization master. Japanese Patent Application Laid-Open No. 2017-50730 discloses a system for performing such time synchronization. In addition, as an apparatus that relays PTP packets, a transparent clock (hereinafter referred to as "TC") and a boundary clock (hereinafter referred to as "BC") are defined by standards.

A TC calculates the time the PTP packet is staying in a device in relaying a PTP packet to another terminal. A communication interface including a PHC has a mechanism for notifying software of the times a packet was transmitted and received. For example, the software calculates the residence time based on the transmission time and the reception time obtained from the PHC. Obtaining the accurate residence time involves synchronization of the times of the PHC of the communication port used for the transmission and the PHC of the communication port used for the reception with each other. To synchronize the times of a PHC and a system clock in a device, open sources are widely used.

Software for synchronizing the times of two PHCs (a PHC 1 and a PHC 2) in a terminal acquires the times and calculates the difference between them. The software first acquires a time (t1) of the PHC 1, next acquires a time (t2) of the PHC 2, and finally acquires a time (t3) of the PHC 1 again. If processing times taken to acquire the times from the PHCs 1 and 2 are the same as each other and the times of the PHCs 1 and 2 are synchronized with each other, the time indicated by $t1+((t3-t1)/2)$ and the time indicated by $t2$ should be the same as each other. Thus, the difference between $t1+((t3-t1)/2)$ and $t2$ indicates the difference between the times for the times of the PHCs 1 and 2 to match each other. The time synchronization is achieved by correcting that difference between the times. This method is also the principle of the time synchronization method employed by open sources.

However, due to arbitration or access competition that occurs in a system bus, the time taken to access from the software to a communication interface provided with a PHC is not always constant.

Further, while the times of the PHCs 1 and 2 are acquired three times in total, an interrupt process may occur. Thus, the acquired times t1, t2, and t3 have fluctuation. To reduce fluctuation, it is possible to acquire the times t1, t2, and t3 multiple times to select the best values among the acquired times t1, t2, and t3, but the fluctuation is not necessarily removable. That is, in some cases, the difference between the times of the PHCs 1 and 2 is not accurately calculated by the above technique.

There is a need in the art for a communication apparatus that obtains an accurate difference between the times of a plurality of clocks.

SUMMARY OF THE DISCLOSURE

According to an aspect of the present disclosure, a communication apparatus includes a plurality of clocks configured to output signals indicating current times, a plurality of counter units configured to synchronize with the plurality of clocks using the signals indicating the current times output from the plurality of clocks, an instruction unit configured to give an instruction to acquire count values of the plurality of counter units, an acquisition unit configured to acquire the count values of the plurality of counter units based on the instruction from the instruction unit, and a calculation unit configured to calculate a difference between the acquired count values.

Further features of the present disclosure will become apparent from the following description of exemplary embodiments with reference to the attached drawings.

DESCRIPTION OF THE EMBODIMENTS

Some exemplary embodiments of the present disclosure will be described in detail below with reference to the attached drawings. The following exemplary embodiments do not limit the present disclosure, and not all the combinations of the features described in the exemplary embodiments are used in solving the issues in the present disclosure. The configurations of the exemplary embodiments can be appropriately modified or changed depending on the specifications of a system and an apparatus to which the present disclosure is applied, or various kinds of conditions (operational conditions and use environment). The technical scope of the present disclosure is determined by the appended claims, and is not determined by the following individual exemplary embodiments.

Figure 1:
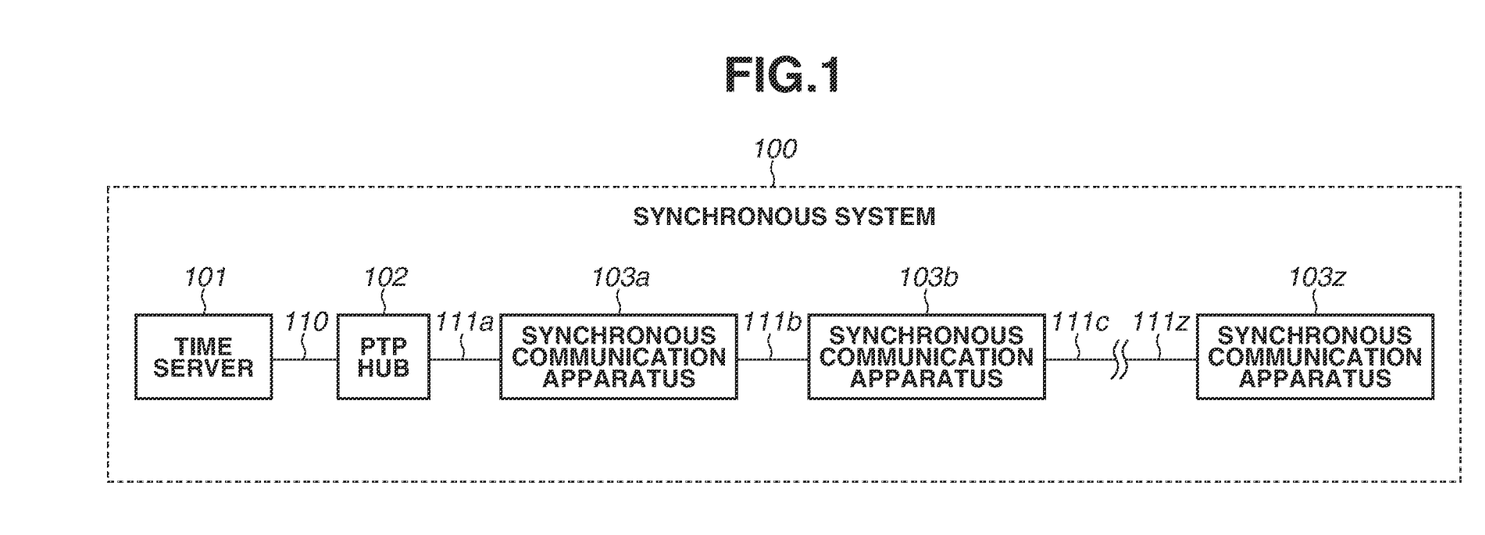
FIG. 1 is a diagram illustrating a configuration of a synchronous system.

A first exemplary embodiment will be described. FIG. 1 schematically illustrates a synchronous system 100 to which the present disclosure is applicable. The synchronous system 100 includes a time server 101, a Precision Time Protocol (PTP) hub 102, and 26 synchronous communication apparatuses 103a to 130z. In the following description, the synchronous communication apparatuses 103a to 103z will be referred to as "synchronous communication apparatuses 103" without distinguishing the individual 26 synchronous communication apparatuses 103a to 103z, unless otherwise stated. For example, each synchronous communication apparatus 103 is an imaging apparatus having a communication function.

The time server 101 has a function of distributing a time to each synchronous communication apparatus 103. In other words, the time server 101 operates as a time synchronization master. In the present exemplary embodiment, a PTP packet is used to distribute a time. Alternatively, a signal based on another time synchronization protocol may be used. The time server 101 is connected to the PTP hub 102 via a transmission path 110.

The PTP hub 102 is a switching hub having a transparent clock (TC) function. Alternatively, the PTP hub 102 may be a boundary clock (BC) in e PTP. The PTP hub 102 can also relay Transmission Control Protocol/Internet Protocol (TCP/IP) packets and another type of packets. The PTP hub 102 is connected to the synchronous communication apparatus 103a via a transmission path 111a.

Each synchronous communication apparatus 103 has at least a TC function. The synchronous communication apparatus 103 may have an ordinary clock (hereinafter referred to as "OC") function in the PTP. The synchronous communication apparatuses 103a to 103z are connected together in a daisy chain manner via transmission paths 111b to 111z. More specifically, the synchronous communication apparatuses 103a and 103h are connected together in a daisy chain manner via the transmission path 111b. The synchronous communication apparatus 103b and the next synchronous communication apparatus (not illustrated) are connected together in a daisy chain manner via the transmission path 111c. The synchronous communication apparatus 103z and the previous synchronous communication apparatus (not illustrated) are connected together in a daisy chain manner via the transmission path 111z.

The transmission paths 110 and 111a to 111z are transmission paths compliant with Ethernet®. Specifically, the transmission paths 110 and 111a to 111z use GbE (Gigabit Ethernet®), 10 GbE, or 100 GbE compliant with Institute of Electrical and Electronics Engineers (IEEE) standards. The transmission paths 110 and 111a to 111z may be transmission paths obtained by combining an InfiniBand interconnect and industrial Ethernet®. The transmission paths 110 and 111a to 111z are not limited to the above transmission paths, and may be other types of transmission paths. In the following description, the transmission paths 111a to 111z will be referred to as "transmission paths 111" without distinguishing the individual 26 transmission paths 111a to 111z, unless otherwise stated.

Figure 2:
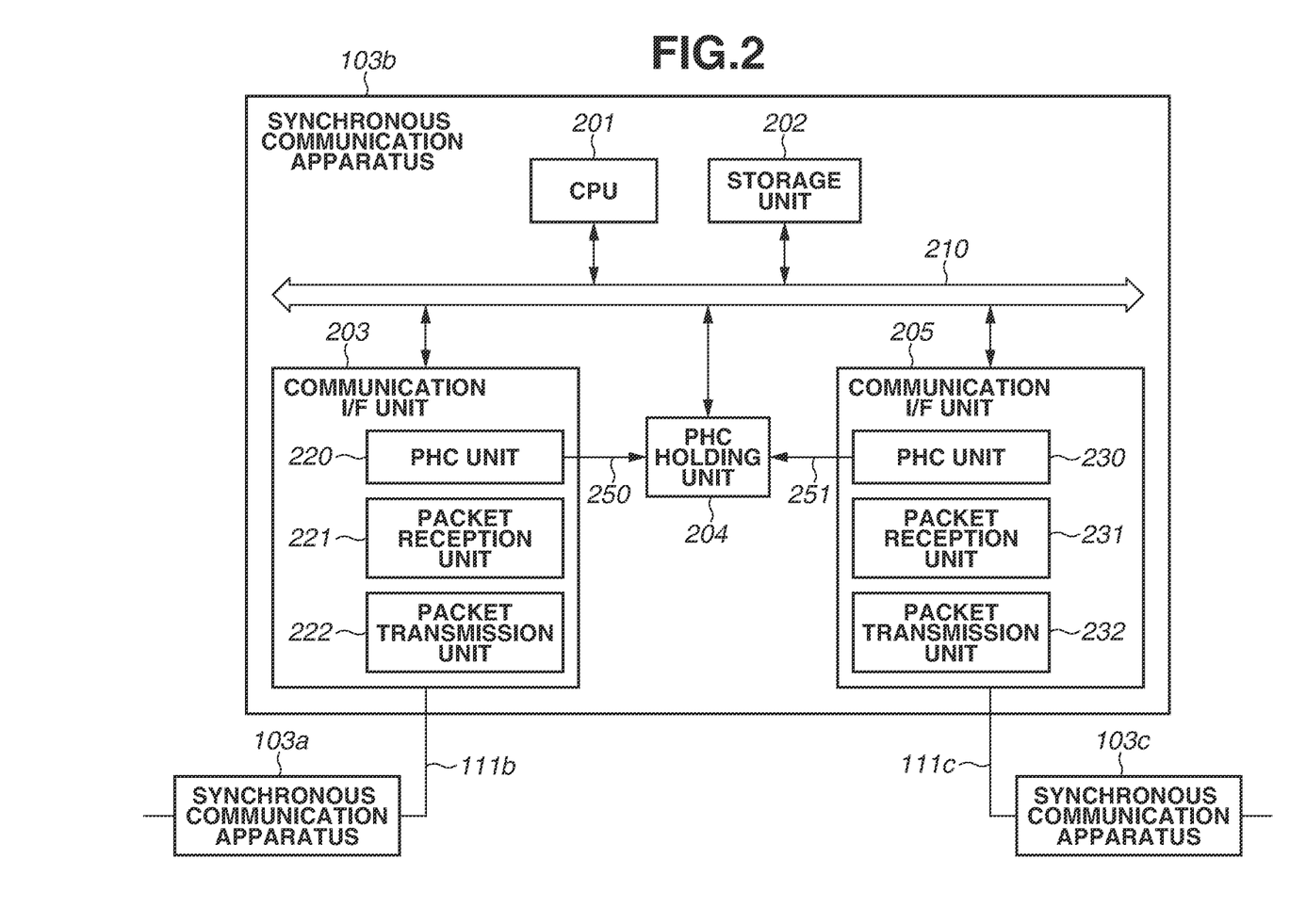
FIG. 2 illustrates a hardware configuration of each synchronous communication apparatus illustrated in FIG. 1.

FIG. 2 illustrates the hardware configuration of the synchronous communication apparatus 103b. Although the synchronous communication apparatus 103b is described in the specification, the other synchronous communication apparatuses 103 also have configurations similar to that of the synchronous communication apparatus 103b.

The synchronous communication apparatus 103b includes a central processing unit (CPU) 201, a storage unit 202, a communication interface (I/F) unit 203, a PTP hardware clock (PHC) holding unit 201, a communication I/F unit 205, and a system bus 210.

The communication I/F unit 203 includes a PHC unit 220, a packet reception unit 221, and a packet transmission unit 222.

The communication I/F unit 205 includes a PHC unit 230, a packet reception unit 231, and a packet transmission unit 232. The communication I/F units 203 and 205 may be the same piece of hardware, or may be different pieces of hardware. Alternatively, a single piece of hardware may include two PHC units, a single piece of hardware may include two packet reception units, and a single piece of hardware may include two packet transmission units.

The CPU 201 is composed of one or more processors such as a CPU and a microprocessor unit (MPU) and runs computer programs stored in the storage unit 202, thereby performing the general control of the synchronous communication apparatus 103b. In the CPU 201, an operating system (OS) runs, thereby performing control of the PTP and synchronous control of the PHCs as processes on the OS. The details of the synchronous control of the PHCs will be described below.

The storage unit 202 is composed of one or more memories such as a read-only memory (ROM) and a random-access memory (RAM) and stores a system program such as the OS, application programs, and various pieces of information such as communication parameters. The storage unit 202 also stores programs for hooting a system programs such as the OS. In addition to the memories such as a ROM and a RAM, a storage medium such as a flexible disk, a hard disk, an optical disc, a magneto-optical disc, a Compact Disc Read-Only Memory (CD-ROM), a Compact Disc-Recordable (CD-R), a magnetic tape, a non-volatile memory card, or a Digital Versatile Disc (DVD) may be used as a part (or all) of the storage unit 202. Alternatively, the storage unit 202 may include a plurality of memories. The storage unit 202 also operates as a working memory used in processing on the OS or used by a driver installed on the OS. For the storage unit 202 composed of a plurality of memories, the storage unit 202 and the system bus 210 may be independently connected to each of the memories.

The communication I/F unit 203 is connected to the synchronous communication apparatus 103a via the transmission path 111b and transmits and receives PTP packets and other types of packets to and from the synchronous communication apparatus 103a using the packet reception unit 221 and the packet transmission unit 222. The transmission and reception of the packets are performed based on instructions from the CPU 201.

The PHC unit 220 has a function of updating the time based on a clock signal input to the PHC unit 220 and in response to instructions from the CPU 201, and a function of periodically notifying the PHC holding unit 204 of the time. Normally, the PHC unit 220 updates the time at the rising timing of a clock signal input to the PHC unit 220. The PHC unit 220 can change the time to values based on instructions from the CPU 201 (phase correction) and change a value to be added to the time of the PHC unit 220 at the rising timing of the clock signal (frequency correction).

The packet reception unit 221 has a function of, if receiving a packet from the transmission path 111b, transferring the received packet to an address indicated by the CPU 201, and if the transfer is completed, notifying the CPU 201 that the transfer is completed. The packet reception unit 221 also has a function of acquiring the time of the PHC unit 220 at the timing when the packet is received from the transmission path 111*b*, and notifying the CPU 201 of the time. The packet reception unit 221 can also select whether or not to acquire the reception time.

The packet transmission unit 222 has a function of reading a transmission packet from the address specified by an instruction from the CPU 201 and then transmitting the transmission packet to the transmission path 111*b*. The packet transmission unit 222 also has a function of, in transmitting the packet to the transmission path 111*b*, acquiring the time of the PHC unit 220 and then notifying the CPU 201 of the time after the transmission of the packet is completed. If the time of the PHC unit 220 to be acquired has been fixed before the transmission of the packet is completed, the packet transmission unit 222 may notify the CPU 201 of the time without waiting for the completion of the transmission of the packet. Similarly to the packet reception unit 221, the packet transmission unit 222 can also select whether or not to acquire a transmission time.

The communication I/F unit 205 has functions similar to those of the communication I/F unit 203. In other words, the PHC unit 230, the packet reception unit 231, and the packet transmission unit 232 have functions similar to those of the PHC unit 220, the packet reception unit 221, and the packet transmission unit 222, respectively.

The PHC holding unit 204 has a function of holding a time 250 of which the PHC holding unit 204 is notified by the PHC unit 220 (which is input from the PHC unit 220 to the PHC holding unit 204) and a time 251 of which the PHC holding unit 204 is notified by the PHC unit 230, The details of the holding of the times 250 and 251 will be described below. The time holding function of the PHC holding unit 204 allows the PHC holding unit 204 to accurately calculate the difference between the times of the PHC units 220 and 230. The PHC holding unit 201 also has a function of acquiring the times of the PHC units 220 and 230 at predetermined intervals using another function of the PHC holding unit 204, and notifying the CPU 201 of the times. The details of the time notification function will be described below.

Figure 3:
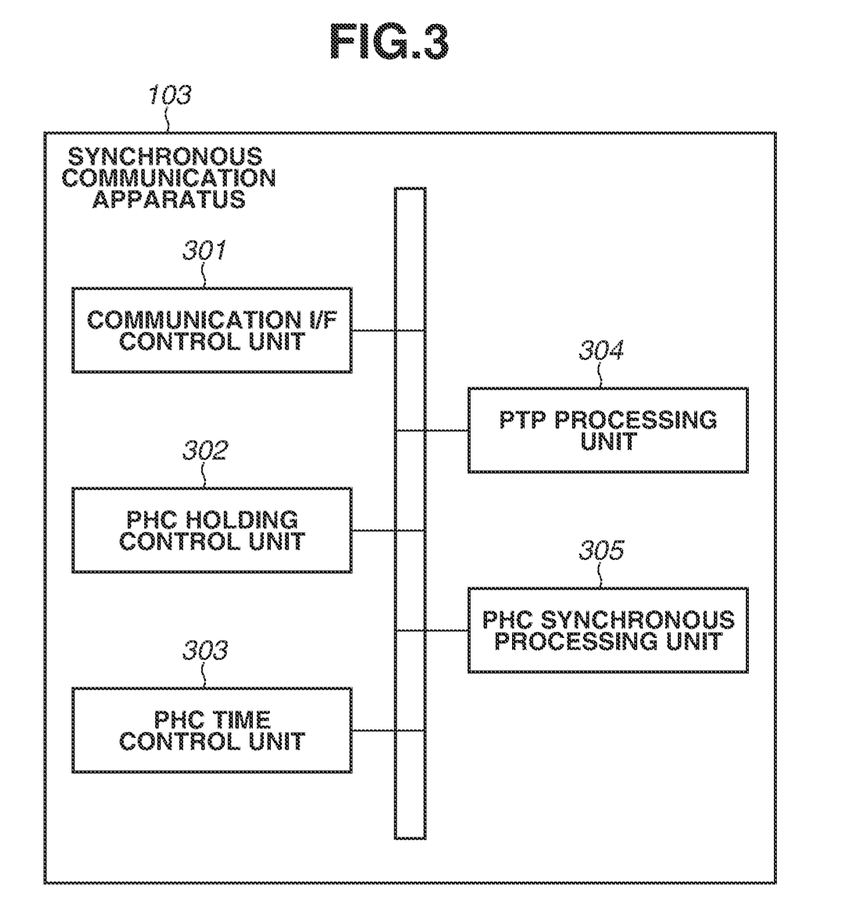
FIG. 3 illustrates a software configuration of each synchronous communication apparatus illustrated in FIG. 1.

FIG. 3 illustrates the software configuration of each synchronous communication apparatus 103. The synchronous communication apparatus 103 includes a communication I/F control unit 301, a PHC holding control unit 302, a PHC time control unit 303, a PTP processing unit 304, and a PHC synchronous processing unit 305 as pieces of software. These pieces of software (301 to 305) are run by the CPU 201.

In response to instructions from a superior application (e.g., the PTP processing unit 304), the communication I/F control unit 301 controls the communication unit 203 or 205 to carry out a packet transmission process and a packet reception process. In the packet transmission process and the packet reception process, the communication I/F control unit 301 also notifies the superior application of a packet reception time and a packet transmission time received from the PHC unit 220 or 230. The superior application may be notified of the times simultaneously with the completion of the transmission and reception of the packets, or separately from the notification of the completion of the transmission and reception of the packets. Alternatively, a configuration may be employed in which the superior application is simultaneously notified of the completion of the reception process and the reception time, but is separately notified of the completion of the transmission process and the transmission time. Conversely, a configuration may be employed in which the superior application is simultaneously notified of the completion of the transmission process and the transmission time, but is separately notified of the completion of the reception process and the reception time. The communication I/F control unit 301 also has a function of, based on instructions from the superior application or a user, controlling the communication I/F unit 203 or 205 not to notify the superior application of the transmission time or the reception time (also not to acquire the transmission time or the reception time). It is suitable that instructions can be given to determine whether or not to notify the superior application of the transmission time or the reception time depending on each type of packet.

In response to instructions from the PHC synchronous processing unit 305, the PHC holding control unit 302 controls the PHC holding unit 204 to start or stop processing. If the PHC holding control unit 302 receives a processing start instruction from the PHC synchronous processing unit 305, the PHC holding control unit 302 instructs the PHC holding unit 204 to start processing, and also starts monitoring the PHC holding unit 204. Then, the PHC holding control unit 302 reads times held in the PHC holding unit 204 and notifies the PHC synchronous processing unit 305 of the times.

In response to instructions from the PTP processing unit 304 or the PHC synchronous processing unit 305, the PHC time control unit 303 corrects the time of the PHC unit 220 or 230. If the amount of correction of the time for the current time is great, the PHC time control unit 303 may select the phase correction, and if the amount of correction of the time for the current time is small, the PHC time control unit 303 may select the frequency correction. Alternatively, the PHC time control unit 303 may always employ either the phase correction or the frequency correction (the phase correction or the frequency correction), or may correct the time using the correction method indicated by the PTP processing unit 304 or the PHC synchronous processing unit 305.

The time may be corrected using a correction method other than the phase correction and the frequency correction.

PTP processing unit 304 is a processing unit that performs a protocol process on a PIP packet. The PTP processing unit 304 has at least a TC function. In response to instructions from the user or instructions from a superior application, the PTP processing unit 304 starts the protocol process.

In carrying out the TC function, the PTP processing unit 304 transmits a PTP packet received from the communication I/F unit 203 to the communication I/F unit 205 and transmits a PTP packet received from the communication I/F unit 205 to the communication I/F unit 203 (hereinafter referred to as a "forward process"). The TC function will calculate the time in which each PTP packet is staying in a terminal (the synchronous communication apparatus 103) (hereinafter referred to as a "residence time"). Thus, the TC function calculates the residence time in performing the forward process.

The residence time is calculated at least based on a Sync packet and a Delay Request packet defined by the PTP. Accurate calculation of the residence time involves synchronization of the times of the PHC units 220 and 230 with each other.

If the PTP processing unit 304 has an OC function, the PTP processing unit 304 calculates the amount of correction from the difference in time from the time server 101 calculated in the protocol process and applies the amount of correction to the PHC units 220 and 230 via the PHC time control unit 303. The calculation of the difference in time and of the residence time will be described with reference to FIG. 4.

Figure 4:
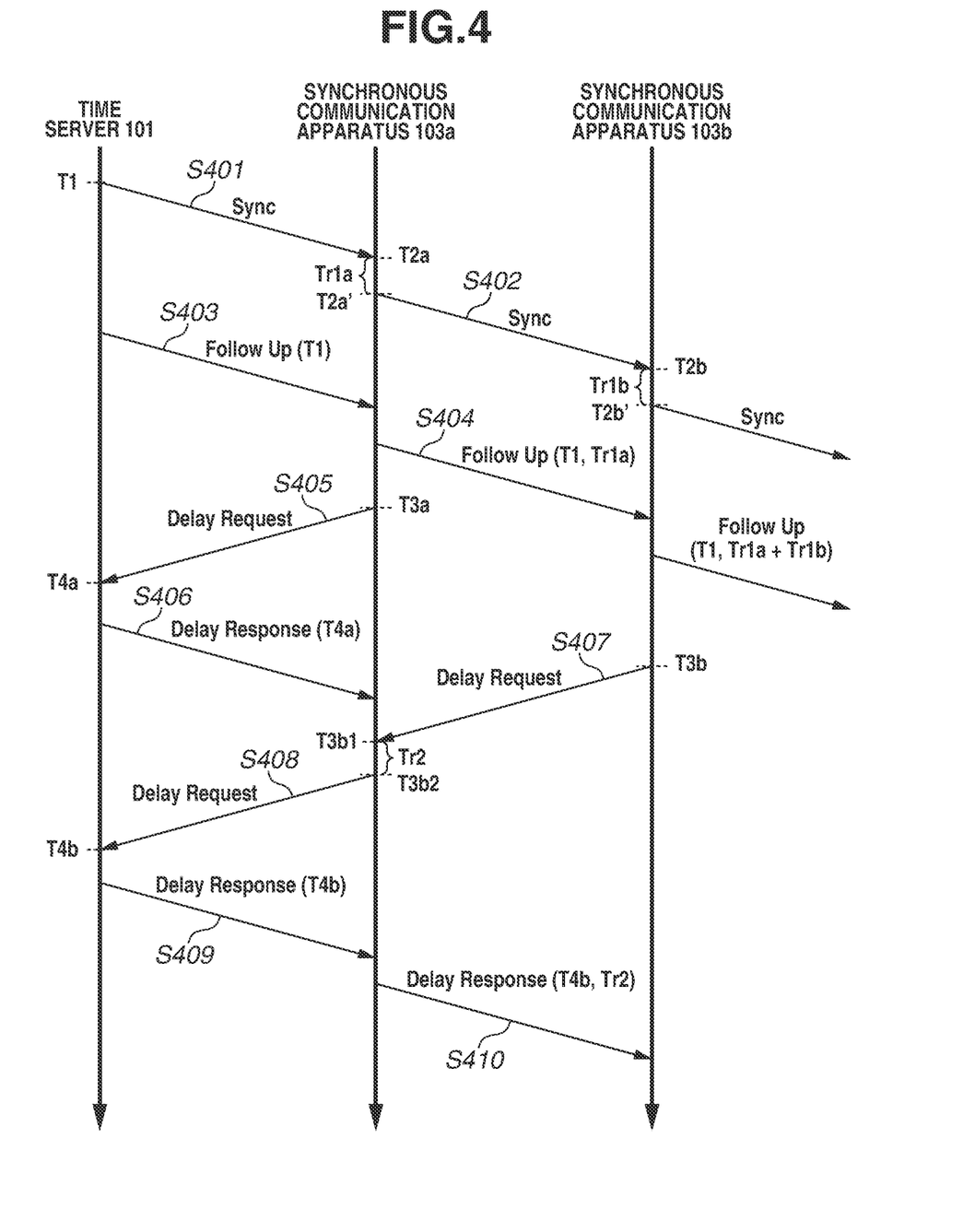
FIG. 4 illustrates a time synchronization sequence of a time server and each synchronous communication apparatus illustrated in FIG. 1.

FIG. 4 is a time synchronization sequence of the time server 101 and each synchronous communication apparatus 103. The PTP hub 102 illustrated in FIG. 1 is omitted.

In step S401, the time server 101 transmits a Sync packet defined by the PTP to the synchronous communication apparatus 103a. Then, the time server 101 holds a transmission time T1 of the Sync packet. The synchronous communication apparatus 103a that has received the Sync packet holds a reception time T2a of the Sync packet.

In step S402, the synchronous communication apparatus 103a performs a forward process on the Sync packet received in step S401, in other words, the synchronous communication apparatus 103a transmits the received Sync packet to the synchronous communication apparatus 103b. If the synchronous communication apparatus 103a performs the forward process, the synchronous communication apparatus 103a also holds a transmission time T2a' of the Sync packet. Similarly, the synchronous communication apparatus 103b that has received the forwarded Sync packet acquires a reception time T2b of the Sync packet and performs a forward process on the Sync packet. In other words, the synchronous communication apparatus 103b transmits the received Sync packet to the synchronous communication apparatus 103c. Then, the synchronous communication apparatus 103b holds a transmission time T2b' of the Sync packet.

In step S403, the time server 101 transmits a Follow Up packet including information regarding the transmission time T1 held in step S401 to the synchronous communication apparatus 103a.

In step S404, the synchronous communication apparatus 103a that has received the Follow Up packet acquires the transmission time T1 included in the Follow Up packet. The synchronous communication apparatus 103a calculates a residence time (Tr1a) of the Sync packet from the held times T2a and T2a'.

Residence time (Sync)=T2a'−T2a=Tr1a

After adding the calculated residence time Tr1a to a predetermined area of the Follow Up packet and performing a forward process on the Follow Up packet, the synchronous communication apparatus 103a makes calculations for time synchronization. At the time of the process in step S404, however, information for making calculations for time synchronization is insufficient, and the synchronous communication apparatus 103a skips a synchronization process. This is because although the residence time Tr1a, which is the delay time of the forward path, is calculated, the delay time of the return path has not yet been calculated. The synchronous communication apparatus 103b that receives the forwarded Follow Up packet also performs similar processing. If a residence time calculated by the synchronous communication apparatus 103b is Tr1b, Tr1a+Tr1b is added to a predetermined area of the Follow Up packet to be sent from the synchronous communication apparatus 103b. The residence time of the Sync packet may be calculated in step S402.

In step S405, the synchronous communication apparatus 103a transmits a Delay Request packet to the time server 101 and holds a transmission time T3a of the Delay Request packet. The time server 101 that has received the Delay Request packet holds a reception time T4a of the Delay Request packet.

In step S406, the time server 101 transmits a Delay Response packet to the synchronous communication apparatus 103a, which has transmitted the Delay Request packet received in step S405. The Delay Response packet includes information regarding the reception time T4a of the Delay Request packet held in step S405. The synchronous communication apparatus 103a that has received the Delay Response packet acquires the information regarding the reception time T4a included in the Delay Response packet and also further acquires the sum of the residence times of the Delay Request packet. Since the PTP hub 102 is omitted in FIG. 4, the sum of the residence times of the Delay Request packet is 0.

In step S407, similarly to step S405, the synchronous communication apparatus 103b transmits a Delay Request packet to the synchronous communication apparatus 103a and acquires (holds) a transmission time T3b of the Delay Request packet.

In step S408, the synchronous communication apparatus 103a that has received the Delay Request packet forwards the Delay Request packet to the time server 101. Similarly to the Sync packet, in performing the forward process, the synchronous communication apparatus 103a holds a time (T3b1) when the Delay Request packet is received and a time (T3b2) when the Delay Request packet is transmitted. The time server 101 that has received the Delay Request packet holds a reception time T4b of the Delay Request packet.

in step S409, similarly to step S406, the time server 101 transmits a Delay Response packet to the synchronous communication apparatus 103a that has transmitted the Delay Request packet received in step S408. The Delay Response packet includes information regarding the reception time T4b of the Delay Request packet held in step S408. The synchronous communication apparatus 103a that has received the Delay Response packet not addressed to the synchronous communication apparatus 103a checks the transmission destination of the Delay Response packet. Then, the synchronous communication apparatus 103a calculates a residence time Tr2 of the Delay Request packet corresponding to the checked transmission destination, adds the residence time Tr2 to a predetermined area of the Delay Response packet, and transfers the Delay Response packet to the synchronous communication apparatus 103b.

Residence time (Delay Request)=T3b2−T3b1=Tr2

In step S410, the synchronous communication apparatus 103b receives the Delay Response packet addressed to the synchronous communication apparatus 103b and acquires the information regarding the reception time T4b included in the Delay Response packet and the residence time (Tr2) of the Delay Request packet. Although FIG. 4 illustrates a single round from a Sync packet to a Delay Response packet for convenience of description, the transmission and reception times (T1 to T4b) and the residence times (Tr1a to Tr2) are repeatedly acquired by repeating this sequence, whereby times can be synchronized with each other. The time server 101 transmits a Sync packet at regular intervals. Immediately after transmitting a Sync packet, the time server 101 transmits a Follow Up packet.

The method of making calculations for time synchronization will be described with the synchronous communication apparatus 103b as an example.

Average transmission path delay between the time server 101 and the synchronous communication apparatus 103b is obtained as follows.

Average transmission path delay=(((T4b−T1)−(T3b−T2b))−(Tr1a+Tr2))/2

If the transmission time of a Sync packet in the second round of the PTP sequence is T5, and the time when the synchronous communication apparatus 103b receives the SYNC packet is T6b (T6a in the synchronous communication apparatus 103a), the difference in time between the time server 101 and the synchronous communication apparatus 103b is obtained as follows.

Difference in time=T6b−T5−average transmission path delay−Tr1a

The average transmission path delay and the difference in time are converted into the following general formulae.

Average transmission path delay=(((reception time of Delay Request−transmission time of Sync)−(transmission time of Delay Request−reception time of Sync))−(sum of residence tunes of Sync+sum of residence times of Delay Request))/2 Difference in time=reception time of Sync−transmission time of Sync−average transmission path delay sum of residence times of Sync or sum of residence times of Delay Request Further, the frequency ratio between the time server 101 and the synchronous communication apparatus 103b is obtained as follows. Fr represents the frequency of the time server 101, and Fo represents the frequency of the synchronous communication apparatus 103b.

Frequency ratio−(Fo−Fr)/Fr

Fr=1/(T5−T1),Fo=1/(T6b−T2b)

Based on these pieces of information, the PTP processing unit 304 corrects the PHC unit 220 via the PHC time control unit 303. The times T2a and T2b, the times T3a and T3b, and the times T6a and T6b are times obtained from the PHC unit 220 of the communication I/F unit 203 on the time server 101. To also synchronize the time of the PHC unit 230 with the time server 101 side, the time of the PHC unit 230 is set to that of the PHC unit 220 before the time is corrected based on the PTP. Then, the correction of the time applied to the PHC unit 220 also is applied to the PHC unit 230.

The sequence illustrated in FIG. 4 is a PHP 2-step method, but times can also be synchronized with each other using a 1-step method. The 1-step method do not use a Follow Up packet, and performs control within each apparatus so that information regarding the times T1, Tr1a, and Tr1b is included in the Sync packet. Then, control is performed within each apparatus so that information regarding the time Tr2 is included in a Delay Request packet. To that end, the packet transmission unit 222 of the communication I/F unit 203 and the packet transmission unit 232 of the communication unit 205 needs to have a function of rewriting a PTP packet. While the packet transmission unit 222 or 232 can acquire the transmission times of the Sync packet and the Delay Request packet from the PHC unit in the communication I/F unit to be used, the packet transmission unit 222 or 232 needs to be notified of the reception times of the Sync packet and the Delay Request packet by the CPU 201. The PTP processing unit 304 compatible with the 1-step method has a function of, in a forward process on a PTP packet, providing the reception time of the packet to a transmission instruction. The packet transmission unit 222 or 232 acquires a transmission time from the PHC unit 220 or 230 including the packet transmission unit 222 or 232, calculates a residence time from a reception time received from the CPU 201, adds the residence time to a predetermined area of a PTP packet, and transmits the PTP packet. The 1-step method may be achieved by calculating a residence time using another method.

The PHC synchronous processing unit 305 synchronizes the times of the PHC units 220 and 230 via the PHC holding control unit 302. The PHC synchronous processing unit 305 starts in response to instructions from the user or instructions from a superior application. As described above, the PHC synchronous processing unit 305 has started and synchronized the times of the PHC units 220 and 230 before the PTP processing unit 304 starts.

Figure 5:
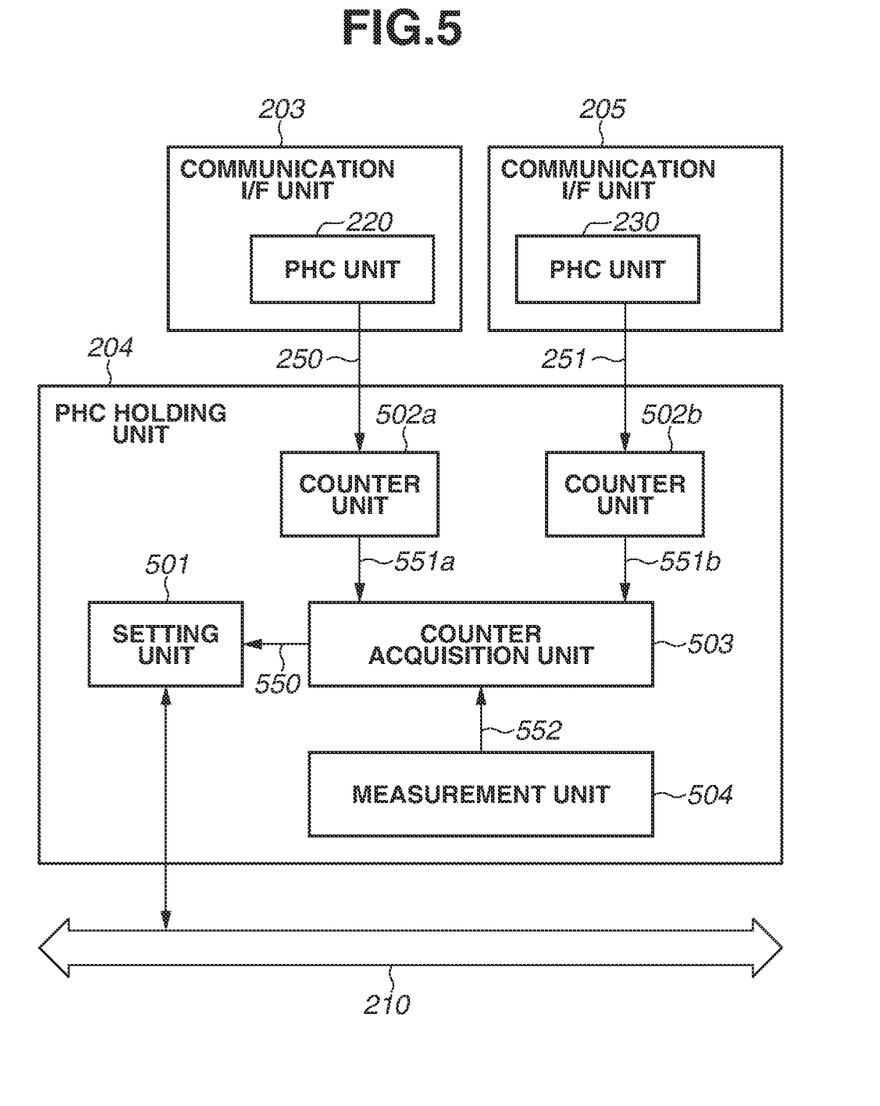
FIG. 5 illustrates a hardware configuration of a Precision Time Protocol (PTP) hardware clock (PHC) holding unit illustrated in FIG. 2.

FIG. 5 illustrates a detailed hardware configuration of the PHC holding unit 204 illustrated in FIG. 2. The PHC holding unit 204 includes a setting unit 501, a counter unit 502a, a counter unit 502b, a counter acquisition unit 503, and a measurement unit 504, The setting unit 501 includes a register (e.g., a status register) within the setting unit 501.

The CPU 201 accesses the setting unit 501 via the system bus 210 and performs general control of the PHC holding unit 204. In the following description, the counter units 502a and 502b will be referred to as "counter units 502" without distinguishing the two counter units 502a and 502b, unless otherwise stated.

The units within the PHC holding unit 204 synchronously operate using a common clock signal. If the PHC unit 220 or 230 uses a clock signal different from that of the PHC holding unit 204, a synchronization circuit is placed between the PHC unit 220 or 230 and the counter unit 502. The synchronization circuit may be placed within the PHC holding unit 204, or may be placed as independent hardware outside the PHC holding unit 204. Each counter unit 502 includes a counter. In the following description, the value of the counter will occasionally be referred to as a "count value". The measurement unit 504 includes a timer.

The setting unit 501 holds the all the settings of the PHC holding unit 204. The setting unit 501 has information regarding the start and the stop of the PHC holding unit 204, information regarding the start and the stop of the synchronization of the counter unit 502 with the PHC units 220 and 230, and information regarding the start and the stop of the measurement of the measurement unit 504. The setting unit 501 can also specify the time of the timer of the measurement unit 504. Further, the setting unit 501 has a function of receiving a time (a count value) and a sequence number notified by the counter acquisition unit 503 (an arrow 550 in FIG. 5), holding them in the register within the setting unit 501, and notifying them to the CPU 201. That is, the setting unit 501 receives the count value from the counter acquisition unit 503 and notifies the CPU 201 of the reception. The setting unit 501 can also be referred to as a reception unit that receives count values. In the update of the time and the sequence number held in the register, the setting unit 501 may output an interrupt signal to the CPU 201. That is, the setting unit 501 may notify the CPU 201 of the reception of a count value using an interrupt signal. The setting unit 501 may display status information in the register, and the CPU 201 may poll the register, thereby detecting the reception of a count value. Alternatively, the setting unit 501 may display a sequence number in the register, and the CPU 201 may poll with the sequence number, thereby detecting that the count value is updated. Then, the CPU 201 may use the detection as a trigger for acquiring a new time. That is, the setting unit 501 may notify the CPU 201 of the reception of the count value using a sequence number.

Each counter unit 502 has a function of updating the value of the counter at the rising of a clock signal input to the counter unit 502. If the counter unit 502 receives a time from the PHC unit 220 or 230, the counter unit 502 calculates the difference (the difference in time) between the time and the count value of the counter unit 502 and adds the difference to (or subtracts the difference from) the count value. If the count value is behind the time of the PHC unit 220 or 230, the counter unit 502 adds the difference. If the count value is ahead of the time, the counter unit 502 subtracts the difference. If the absolute value of the difference from the time of the PHC unit (220 or 230) is great, the difference may not be added (subtracted) as it is for the count value to be updated within a certain change in the count value. That is, for example, even if the difference is 100, 64 is added to (or subtracted from) the count value. The difference is not reflected as it is in the count value, achieving gradual synchronization with the counter unit 502. If the counter unit 502 does not receive a time from the PHC unit 220 or 230, the counter unit 502 adds a certain value to the value of the counter.

The value (the certain value) to be added is based on the frequency of a clock signal input to the PHC holding unit 204. If the difference from the time of the PHC unit (220 or 230) is great, the value to be added may be greater than (or smaller than) the value based on the frequency of the clock signal.

The value to be added at the timing of the rising of the clock may differ each time. The value to be added may be calculated by automatic control such as proportional-integral control (PI control), using the difference between the time of the receipt from the PHC unit 220 or 230 and the time of the counter unit 502. The above operation makes the count value of the counter unit 502 a time synchronized with that of the PHC unit 220 or 230 connected to the counter unit 502. Alternatively, the difference may be calculated not at intervals at which the counter unit 502 is notified of the time by the PHC unit 220 or 230, but at intervals set by the setting unit 501 (once every 16 times of the rising of a clock signal or once every 16 times of the reception of a notification signal from the PHC unit 220 or 230). These calculations may be divided into a plurality of cycles.

The counter unit 502 also outputs the value of the counter of the counter unit 502 to the counter acquisition unit 503 (551a and 551b) at all times. It is suitable that the number of bits of the counter of the counter unit 502 is greater than or equal to the number of bits of the PHC unit 220 or 230. A smaller number of bits of the counter of the counter unit 502 than the number of bits of the PHC unit 220 or 230 prevents an accurate difference between the times from being obtained, in which case the following control is performed. Before the PHC holding unit 204 starts synchronizing times, the CPU 201 controls the PHC unit 220 or 230 so that the difference between the times of the PHC units 220 and 230 is smaller than the value represented by the number of bits of the counter included in the counter unit 502.

If the counter acquisition unit 503 receives a counter acquisition notification 552 from the measurement unit 504, the counter acquisition unit 503 simultaneously acquires count values from the counter units 502a and 502b at the timing of the rising of a clock signal. In the PHC holding unit 204, a common clock signal is used, and the count values are acquired at the same rising timing of the clock signal. Thus, literally, the counter acquisition unit 503 can simultaneously acquire count values of the counter units 502a and 502b. Then, the counter acquisition unit 503 gives a notification (550) of the count values together with sequence numbers to the setting unit 501. That is, the counter acquisition unit 503 notifies the setting unit 501 of the count values (550) together with sequence numbers attached to the count values.

The count values to be acquired may be switched every time the counter acquisition notification 552 is received. That is, when the counter acquisition notification 552 is given at an N-th time, the counter acquisition unit 503 may acquire the count value of the counter unit 502a and notify the setting unit 501 of the count value together with the sequence number. Then, when the counter acquisition notification 552 is given at an N+1-th time, the counter acquisition unit 503 may acquire the count value of the counter unit 502b and notify the setting unit 501 of the count value together with the sequence number. If the count value of the counter unit 502a acquired based on the notification given at the N-th time is tx, and the interval at which the notification is given is ty, and the count value of the counter unit 502b acquired based on the notification given at the N+1-th time is tz, it can be considered that if the following formula is satisfied, the times of the PHC units 220 and 230 match each other.

$$tx+ty=tz$$

The above formula allows the difference between the times of the PHC units 220 and 230 to be calculated to correct the times. That allows the difference between the times of the PHC units 220 and 230 to be calculated without acquiring the count values from both of the counter units 502 (502a and 502b) every time the counter acquisition notification 552 is given. If the counter acquisition notification 552 is received and the count value of the counter unit 502a and the count value of the counter unit 502b are simultaneously acquired, the difference between the two count values indicates the difference between the times of the PHC units 220 and 230. The difference between the two count values is calculated by the CPU 201. A delay time that occurs when the count value is acquired from each of the counter units 502a and 502b is one cycle because the count values are acquired at the same rising timing of a common clock signal in the PHC holding unit 204. That is, according to the present exemplary embodiment, fluctuation that occurs when times are directly acquired from PHCs by software disappears.

If a measurement start instruction is given by the CPU 201, the measurement unit 504 starts the timer. If the timer reaches a predetermined value (a tinier time), the measurement unit 504 issues (transmits) the counter acquisition notification 552 to the counter acquisition unit 503. After issuing the counter acquisition notification 552, the measurement unit 504 resumes the timer operation unless a measurement stop instruction or a stop instruction to stop the PHC holding unit 204 is given. The timer may measure time (perform the timer operation) using the clock signal input to the measurement unit 504 or using the time of the PHC unit 220 or 230. In the latter case, the time from the PHC unit 220 or 230 is also input to the measurement unit 504. The timer may measure time with the values of the counter units 502. In this case, the values of the counter units 502 are also input to the measurement unit 504. The time to be measured (the timer time) is specified in the setting unit 501 by the CPU 201. The time to be specified is a time sufficiently longer than the period the CPU 201 completes obtaining all the values (and sequence numbers) of the two counters (e.g., a second). This is because a short timer time may cause the counters to be updated to the next values of the counters before the values of the counters are obtained. Thus, the timer time (the predetermined time interval) is set to a time sufficiently longer than the period the counter acquisition unit 503 acquires all the count values.

Generally, times to be synchronized with each other in the PIP use the same epoch as UNLX® time. A time (250 or 251) output from a PHC does not necessarily have the same bit field length as that of UNIX® time managed by the software. The time output from a PHC has a field representing a second and a field representing a nanosecond, and in some cases, has a field representing a sub-nanosecond, and the bit length of each field differs depending on each piece of hardware. Even if the CPU 201 has a 64-bit configuration, the value of the counter unit 502*a* and the value of the counter unit 502*b* are not necessarily able to be simultaneously acquired (do not necessarily fall within the range of 64 bits) in a single access. That results in a sufficient long timer time to be measured by the measurement unit 504.

Figure 6:
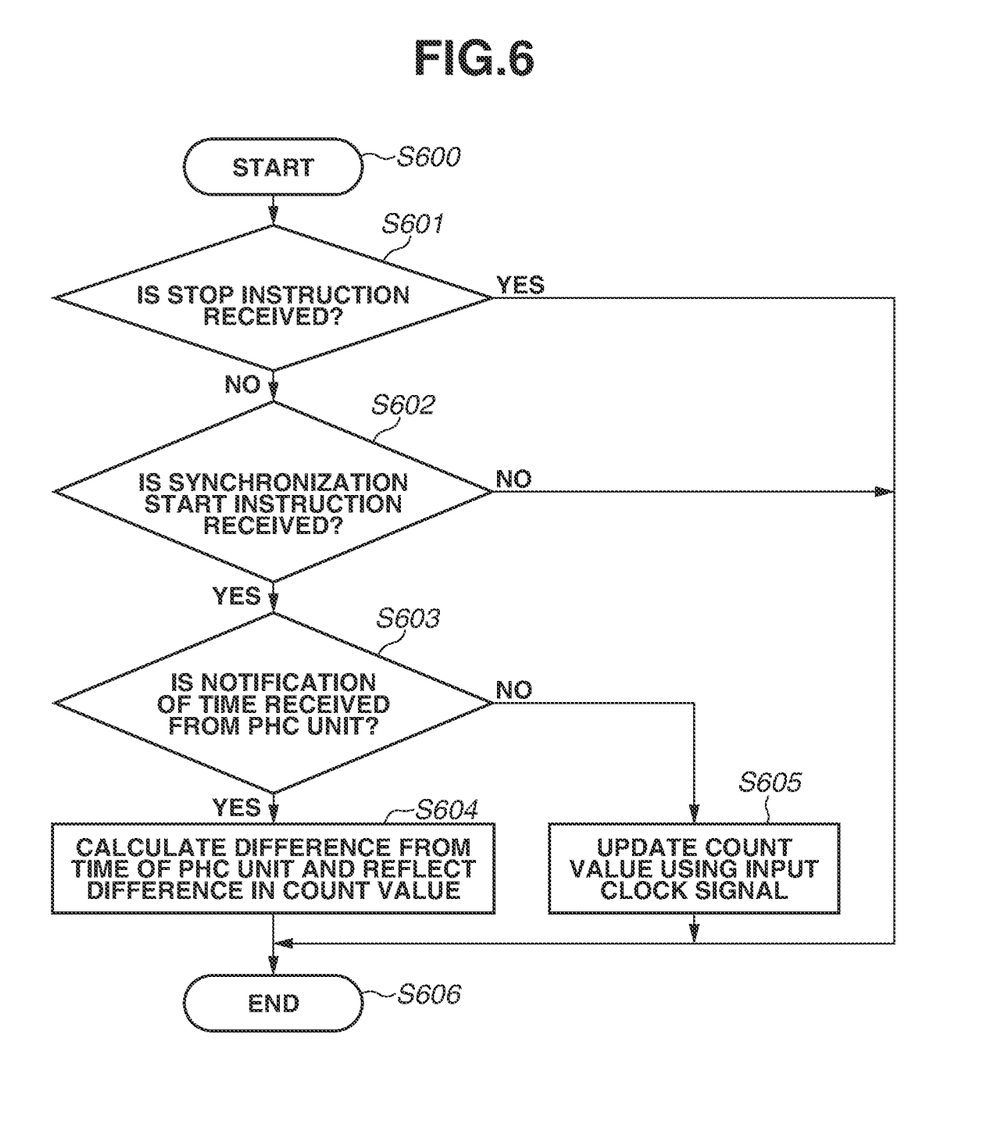
FIG. 6 illustrates a flowchart for an operation of each counter unit.

Next, with reference to FIG. 6, an operational flowchart for each counter unit 502 will be described. In step S600, the operation in the flowchart in FIG. 6 is started every time the rising edge of a clock signal input to the counter unit 502 occurs with the reset of the synchronous communication apparatus 103 cancelled after the synchronous communication apparatus 103 is powered on. Thus, the processing from the start (step S600) to the end (step S606) of the flowchart in FIG. 6 is completed in the period of one cycle of the input clock signal.

In step S601, the counter unit 502 determines whether a stop instruction to stop the PHC holding unit 204 is received. If the stop instruction is received (YES in step S601), the counter unit 502 performs nothing, the processing proceeds to step S606, and this flow ends. Otherwise (i.e., a start instruction is received) (NO in step S601), the processing proceeds to step S602. The start instruction and the stop instruction are given via the setting unit 501 by the PHC holding control unit 302 instructed by the PHC synchronous processing unit 305.

In step S602, the counter unit 502 determines whether a synchronization start instruction is received. If the instruction is received (YES in step S602), the processing proceeds to step S603. If not (NO in step S602), the processing proceeds to step S606, and this processing ends. The synchronization start instruction is given via the setting unit 501 by the PHC holding control unit 302 instructed by the PHC synchronous processing unit 305.

In step S603, the counter unit 502 determines whether a notification of a time is received (input) from the PHC unit 220 or 230. If the notification is received (YES in step S603), the processing proceeds to step S604. Otherwise (NO in step S603), the processing proceeds to step S605.

In step S604, the counter unit 502 calculates the difference between the time received from the PHC unit 220 or 230 and the current count value and reflects the difference in (adds the difference to or subtracts the difference from) the count value. Then, the processing proceeds to step S606, in which this processing ends.

In step S605, the counter unit 502 updates the count value using the clock signal input to the counter unit 502. Then, the processing proceeds to step S606, in which this processing ends.

Figure 7:
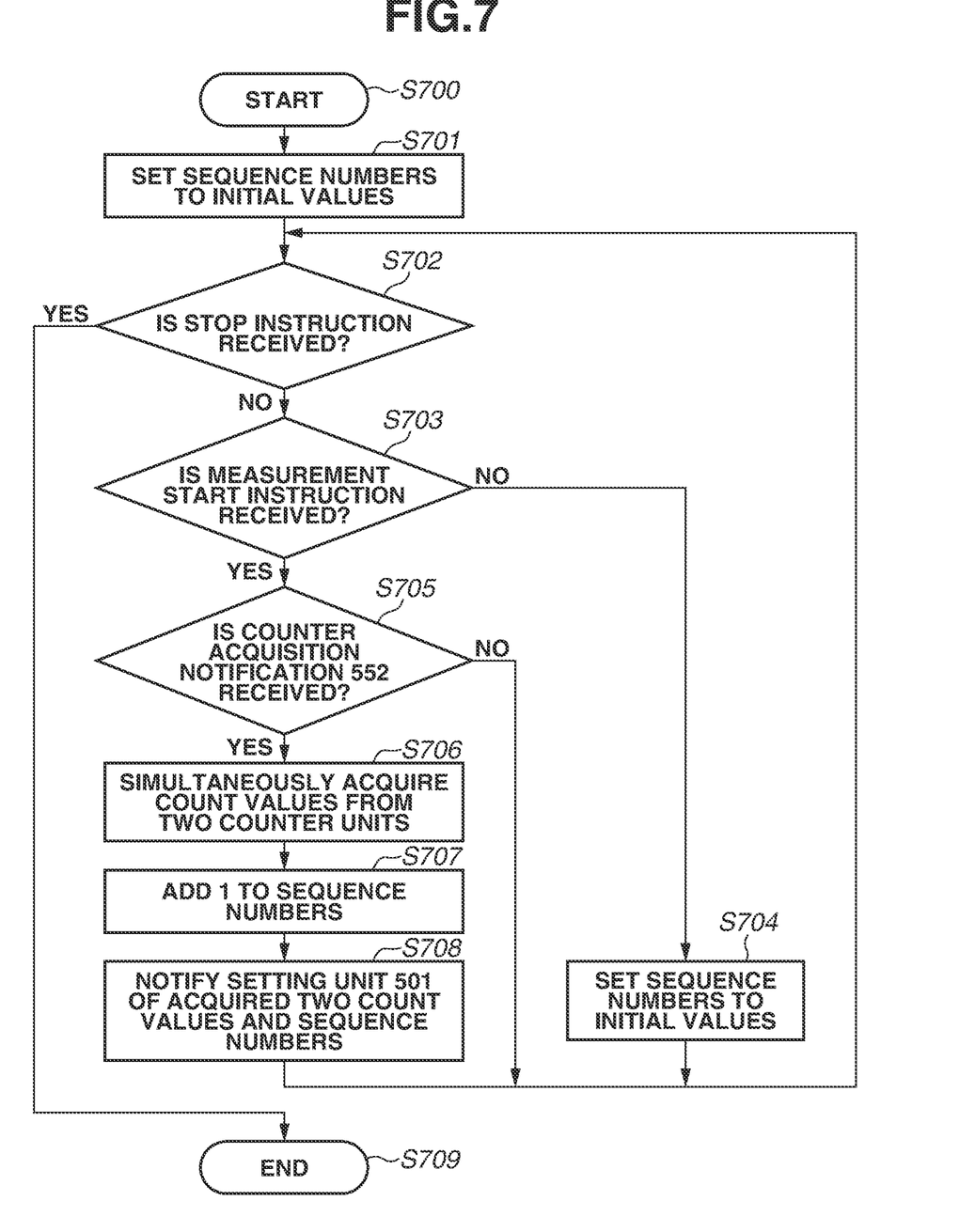
FIG. 7 illustrates a flowchart for an operation of a counter acquisition unit.

Next, with reference to FIG. 7, an operational flowchart for the counter acquisition unit 503 will be described. In step S700, the operation in the flowchart in FIG. 7 is started in response to when a start instruction to start the MC holding unit 204 is received.

In step S701, the counter acquisition unit 503 sets sequence numbers held in the counter acquisition unit 503 to initial values, and the processing proceeds to step S702.

In step S702, the counter acquisition unit 503 determines whether a stop instruction to stop the PHC holding unit 204 is received. If the stop instruction is received (YES in step S702), the processing proceeds to step S709, in which this processing ends. Otherwise (NO in step S702), the processing proceeds to step S703.

In step S703, the counter acquisition unit 503 determines whether a measurement start instruction is received. If the instruction is received (YES in step S703), the processing proceeds to step S705. Otherwise (NO in step S703), the processing proceeds to step S704.

In step S704, similarly to step S701, the counter acquisition unit 503 sets the sequence numbers held in the counter acquisition unit 503 to the initial values, and the processing returns to step S702.

In step S705, the counter acquisition unit 503 determines whether the counter acquisition notification 552 is received from the measurement unit 504. If the notification 552 is received (YES in step S705), the processing proceeds to step S706. If not (NO in step S705), the processing returns to step S702.

In step S706, the counter acquisition unit 503 simultaneously acquires the count values from both the counter units 502*a* and 502*b*. After the count values are acquired, the processing proceeds to step S707.

In step S707, the counter acquisition unit 503 adds 1 to the sequence numbers, and the processing proceeds to step S708.

In step S708, the counter acquisition unit 503 gives a notification (550) of the two count values acquired in step S706 and the sequence numbers to the setting unit 501, and the processing proceeds to step S702.

Figure 8:
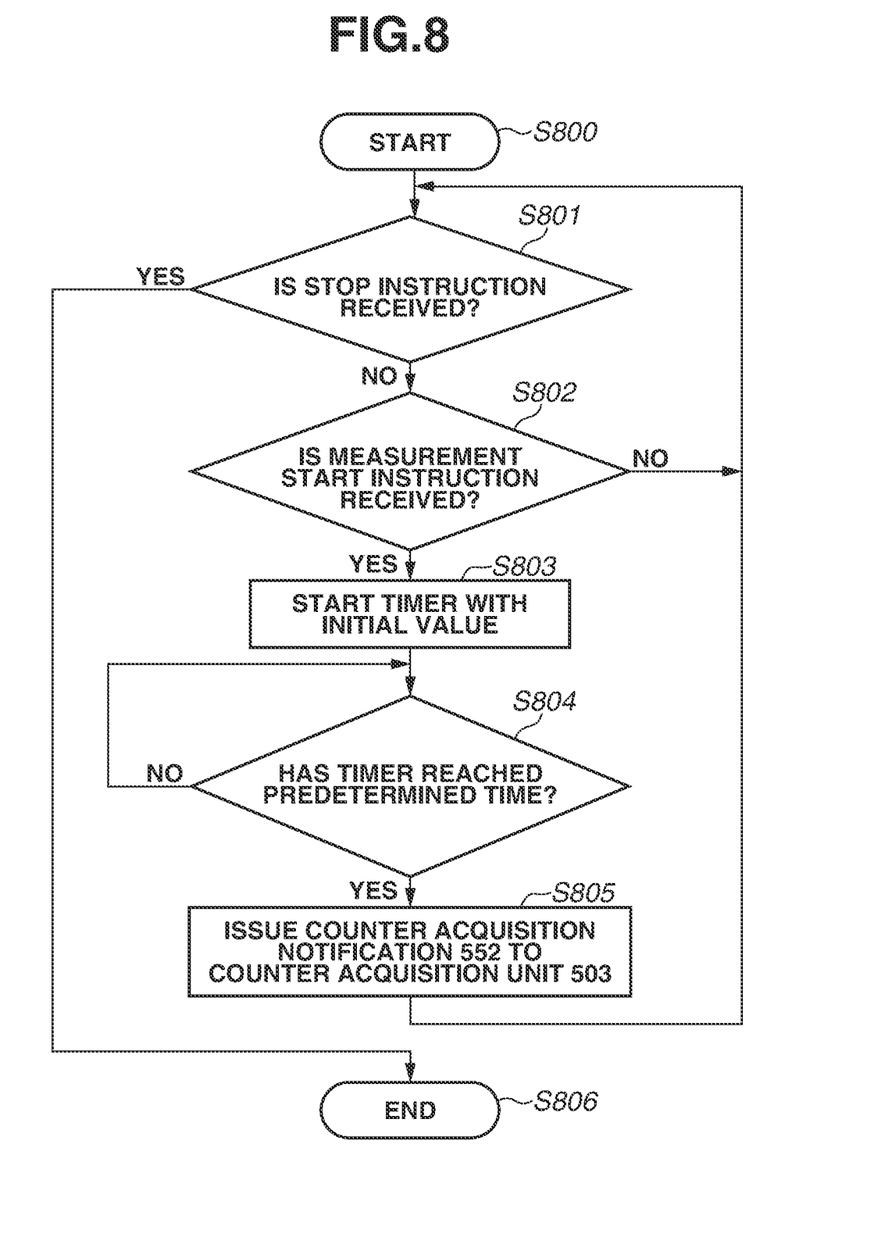
FIG. 8 illustrates a flowchart for an operation of a measurement unit.

Next, with reference to FIG. 8, an operational flowchart for the measurement unit 504 will be described. In step S800, the operation in the flowchart in FIG. 8 is started in response to when a start instruction to start the PHC holding unit 204 is received.

In step S801, the measurement unit 504 determines whether a stop instruction to stop the PHC holding unit 204 is received. If the stop instruction is received (YES in step S801), the processing proceeds to step S806, in which this processing ends. Otherwise (NO in step S801), the processing proceeds to step S802.

In step S802, the measurement unit 504 determines whether a measurement start instruction is received. If the instruction is received (YES in step S802), the processing proceeds to step S803, Otherwise (NO in step S802), the processing returns to step S801.

In step S803, the measurement unit 504 starts measuring time using the tinier with an initial value, and the processing proceeds to step S801. The timer may decrement time or increment time.

In step S804, the measurement unit 504 determines whether the tinier reaches a predetermined time (the timer time). If the timer reaches the predetermined time (YES in step S804), the processing proceeds to step S805. Otherwise (NO in step S804), the processing returns to step S804. The tinier time to be measured is specified in the setting unit 501 by the PHC holding control unit 302 instructed by the PHC synchronous processing unit 305.

In step S805, the measurement unit 504 issues the counter acquisition notification 552 to the counter acquisition unit 503, and the processing returns to step S801.

The above processing allows each counter unit 502 of the PHC holding unit 204 to synchronize with the PHC unit 220 or 230. The PHC synchronous processing unit 305 operating on the CPU 201 is ultimately notified of the value of the counter unit 502 via the setting unit 501 at predetermined time intervals. The PHC synchronous processing unit 305 that has received the notification can accurately calculate the difference between the times of the PHC units 220 and 230 with the notified two count values.

Although the case has been described where two PHC units are used in the above exemplary embodiment, the above exemplary embodiment can also be applied to cases where three or more PHC units are used.

The communication I/F control unit 301, the PHC holding control unit 302, the PHC time control unit 303, the PTP processing unit 304, and the PHC synchronous processing unit 305 illustrated in FIG. 3 may be partly or all used as dedicated hardware such as an application-specific integrated circuit (ASIC) or a programmable logic array (PLA) in the synchronous communication apparatus 103. If these units are used as hardware, each unit may be used as a dedicated hardware module, or some of the units may be collectively used as a dedicated hardware module.

A second exemplary embodiment will be described. In the second exemplary embodiment, if the PHC synchronous processing unit 305 determines that the calculated difference between the times of the PHC units 220 and 230 is less than or equal to a threshold (e.g., zero) a predetermined number of times, the PHC synchronous processing unit 305 makes the timer time longer via the setting unit 501 of the PHC holding unit 204.

The time interval is increased (the timer time is made longer), whereby a gap between the PHC units 220 and 230 that does not appear at originally set time intervals appears as a difference between the times. Thus, time synchronization can be achieved with higher accuracy. This is because when the time interval is Tx and the gap between the times is Δ, and if the time synchronization becomes stable, the following phenomenon occurs. That is, after the period when Δ=0 continues, and when the difference between the times is calculated next, Δ=1. Since Δ is merely the difference between the times when the period of the time interval Tx is evaluated, the amount of correction of the time synchronization is calculated taking into account the value of the time interval Tx. If the frequency correction is used, the greater the time interval Tx is, the smaller the value of the amount of correction for adjusting the frequency is. Thus, the time synchronization can be adjusted more finely. Thus, the times can be synchronized with each other with high accuracy. The timing when the timer time is made longer may be after the difference between the times less than or equal to the threshold continues the predetermined number of times, or may be another timing.

Other Exemplary Embodiments

The present disclosure can also be achieved by the process of supplying a program for achieving one or more functions of the above exemplary embodiments to a system or an apparatus via a network or a storage medium, and of causing one or more processors of a computer of the system or the apparatus to read and run the program. The present disclosure can also be achieved by a circuit (e.g., an ASIC) for carrying out the one or more functions.

According to the present disclosure, the difference between the times (the difference between count values) of a plurality of clocks can be obtained with accuracy.

Embodiment(s) of the present disclosure can also be realized by a computer of a system or apparatus that reads out and executes computer executable instructions (e.g., one or more programs) recorded on a storage medium (which may also be referred to more folly as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s), The computer may comprise one or more processors (e.g., central processing unit (CPU), micro processing unit (MPU) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-105593, filed Jun. 25, 2021, which is hereby incorporated by reference herein in its entirety.

What is claimed is:

1. A communication apparatus comprising:
a plurality of clocks comprising a first clock configured to output a first signal indicating current time and a second clock configured to output a second signal indicating current time;
a plurality of counter units comprising a first counter unit configured to synchronize with the first clock using the first signal and a second counter unit configured to synchronize with the second clock using the second signal;
an instruction unit configured to give an instruction to acquire count values of the plurality of counter units;
an acquisition unit configured to acquire the count values of the plurality of counter units based on the instruction from the instruction unit; and
a calculation unit configured to calculate a difference between the acquired count values.

2. The communication apparatus according to claim 1, wherein the acquisition unit acquires the count values of the plurality of counter units at a predetermined time interval.

3. The communication apparatus according to claim 2, wherein the predetermined time interval is a time sufficiently long for the acquisition unit to acquire all the count values.

4. The communication apparatus according to claim 2, further comprising a setting unit configured to set the predetermined time interval,
wherein in a case where it is determined a predetermined number of times that the calculated difference between the count values is less than or equal to a threshold, the setting unit makes the predetermined time interval longer.

5. The communication apparatus according to claim 1, wherein in a case where the first and second signals indicating the current times output from the clocks are input to the plurality of counter units, the plurality of counter units update the count values based on differences between the current times when the first and second signals indicating the current times output from the clocks are received and times of the plurality of counter units.

6. The communication apparatus according to claim 1, wherein the acquisition unit simultaneously acquires the count values of the plurality of counter units according to the instruction from the instruction unit.

7. The communication apparatus according to claim 1, further comprising a reception unit configured to receive the count values from the acquisition unit,
wherein the reception unit notifies the calculation unit that the received count values are present.

8. The communication apparatus according to claim 7, wherein using an interrupt signal, the reception unit notifies the calculation unit that the received count values are present.

9. The communication apparatus according to claim 7, wherein using sequence numbers attached to the count values, the reception unit notifies the calculation unit that the received count values are present.

10. The communication apparatus according to claim 1, wherein in a case where the first and second signals indicating the current times output from the plurality of clocks are not input to the plurality of counter units, the plurality of counter units update the count values using clock signals input to the plurality of counter units.

11. The communication apparatus according to claim 1, further comprising a control unit configured to control synchronization of the plurality of clocks based on the calculated difference between the count values.

12. A method of calculating a difference between times of a plurality of clocks, comprising a first clock and a second clock, provided in a communication apparatus in which a plurality of counter units is provided, wherein a first counter unit in the plurality of counter units corresponds to the first clock and a second counter unit in the plurality of counter units corresponds to the second clock, the method comprising:
synchronizing the plurality of counter units with the plurality of clocks using signals indicating current times output from the plurality of clocks;
giving an instruction to acquire count values of the plurality of counter units;
acquiring the count values of the plurality of counter units based on the instruction to acquire the count values; and
calculating a difference between the acquired count values.

13. A non-transitory storage medium that stores a program for causing a computer to execute a method of calculating a difference between times of a plurality of clock, comprising a first clock and a second clock, provided in a communication apparatus in which a plurality of counter units is provided, wherein a first counter unit in the plurality of counter units corresponds to the first clock and a second counter unit in the plurality of counter units corresponds to the second clock, the method comprising:
synchronizing the plurality of counter units with the plurality of clocks using signals indicating current times output from the plurality of clocks;
giving an instruction to acquire count values of the plurality of counter units;
acquiring the count values of the plurality of counter units based on the instruction to acquire the count values; and
calculating a difference between the acquired count values.

* * * * *